US008291414B2

(12) United States Patent
Bansal et al.

(10) Patent No.: US 8,291,414 B2
(45) Date of Patent: Oct. 16, 2012

(54) SHARED RESOURCE SERVICE PROVISIONING USING A VIRTUAL MACHINE MANAGER

(75) Inventors: Ravi P. Bansal, Tampa, FL (US); Rhonda L. Childress, Austin, TX (US); Steven M. Weinberger, Lewis Center, OH (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 12/332,444

(22) Filed: Dec. 11, 2008

(65) Prior Publication Data

US 2010/0153945 A1    Jun. 17, 2010

(51) Int. Cl.
*G06F 9/46* (2006.01)
(52) U.S. Cl. ............................................. 718/1; 718/103
(58) Field of Classification Search ........................ None
See application file for complete search history.

(56) References Cited

U.S. PATENT DOCUMENTS

| | | | |
|---|---|---|---|
| 4,811,276 A | 3/1989 | Suga | |
| 6,374,286 B1 | 4/2002 | Gee et al. | |
| 7,010,793 B1 * | 3/2006 | Chatterjee et al. | 719/316 |
| 7,325,233 B2 * | 1/2008 | Kuck et al. | 718/103 |
| 7,415,704 B2 * | 8/2008 | Schmidt et al. | 717/166 |
| 2002/0099753 A1 | 7/2002 | Hardin et al. | |
| 2002/0120660 A1 | 8/2002 | Hay et al. | |
| 2003/0037089 A1 * | 2/2003 | Cota-Robles et al. | 709/1 |
| 2007/0169121 A1 * | 7/2007 | Hunt et al. | 718/1 |
| 2008/0134176 A1 * | 6/2008 | Fitzgerald et al. | 718/1 |
| 2008/0189709 A1 * | 8/2008 | Amin | 718/102 |

* cited by examiner

*Primary Examiner* — Eric Coleman
(74) *Attorney, Agent, or Firm* — Yudell Isidore Ng Russell PLLC

(57) ABSTRACT

A virtual machine manager (VMM) enables provisioning of services to multiple clients via a single data processing system configured as multiple virtual machines. The VMM performs several management functions, including: configuring/assigning each virtual machine (VM) for/to a specific, single client; scheduling the time and order for completing client services via the assigned client VM; instantiating a client VM at a scheduled time and triggering the execution of services tasks required for completing the specific client services on the client VM; monitoring and recording historical information about the actual completion times of services on a client VM; and updating a scheduling order for sequential instantiating of the multiple client VMs and corresponding client services, based on one or more of (i) pre-established time preferences, (ii) priority considerations, and (iii) historical data related to actual completion times of client services at a client VM.

27 Claims, 6 Drawing Sheets

SHARED RESOURCE SERVICE PROVISIONING USING A VIRTUAL MACHINE MANAGER

BACKGROUND

1. Technical Field

The present invention generally relates to computer systems and in particular to use of multiple virtual machines sharing system resources to support multiple client services.

2. Description of the Related Art

Information Technology (IT) service providers are businesses or organizations that provide IT services (e.g., Internet services, application services, backup services, configuration and asset management services, and support desk services) to other businesses or organizations (often referred to as customers or clients). For example, a service provider may prove discovery services, such as inventory scanning, for a customer's IT environment. Such a service involves using an automated means to discover or scan various hardware and software resources installed within the customer's IT environment to generate a complete inventory or asset report.

Currently, both internal and external service providers may provide a discovery service to a customer by setting up an "inventory scanner" for the customer. The "inventory scanner" server is usually a hardware Intel or Unix machine owned and maintained by the service provider. In addition, the service provider also installs a variety of software, such as the scanning engine application, Middleware and databases on the machine. Once the scans are performed using the inventory scanning engine, inventory data gets populated in an inventory database and a report is generated and emailed to the customer.

Current art methods of service provisioning are typically performed by making use of dedicated hardware and software assets that are owned and maintained by the service providers. For example, the inventory scanning server is configured for, and populated with data dedicated to, a particular customer. The same server cannot be used for providing the same or a different service to another customer because (a) the configuration required for the second customer's IT environment may be very different and (b) the data from the second customer's environment would not be isolated from the data from the first customer's environment. Therefore, for example, a service provider is unable to provide inventory scanning for one customer and backup service for another customer from the same physical machine. In the case of a need to provide discovery services for a second customer, a second "inventory scanning server" is required to be set up for the second customer, with a second hardware machine hosting a second set of software. In addition, due to privacy and security reasons, some customers are wary about services being provided to them from the same physical machine that is also being used to provide the same or different services for another customer.

SUMMARY OF ILLUSTRATIVE EMBODIMENTS

Disclosed are a method, a system and a computer program product for enabling provisioning of services to multiple clients via a single data processing system configured as multiple virtual machines with a virtual machine manager (VMM). The VMM performs several management functions, including (a) configuring/assigning each virtual machine (VM) for/to a specific, single client to create a client VM, (b) scheduling the time and order for completing client services via the assigned client VM, (c) instantiating a client VM at a scheduled time and triggering the execution of services tasks required for completing the specific client services on the client VM, (d) monitoring and recording historical information about the actual completion times of services on a client VM, and (e) updating a scheduling order for sequential instantiating of the multiple client VMs and corresponding client services, based on one or more of (i) pre-established time preferences, (ii) priority considerations, and (iii) historical data related to actual completion times of client services at a client VM.

The method comprises: assigning a first client to a first virtual machine (VM) from among the multiple virtual machines supported by the single data processing system; assigning a second client to a second virtual machine (VM) from among the multiple virtual machines supported by the single data processing system; identifying one or more first services that are required by the first client and one or more second services that are required by the second client, wherein the one or more first and second services are specific services performed on the single data processing system for an assigned client; identifying service tasks required to be executed in order to complete the one or more services of the first client and service tasks required in order to complete the one or more services of the second client; configuring the first VM to provide service to only the first client, wherein the first VM is tagged to an identification (ID) of the first client, and the first services and associated service tasks are linked to the first VM; configuring the second VM to provide service to only the second client, wherein the second VM is tagged to an identification (ID) of the second client, and the second services and associated service tasks are linked to the second VM; dynamically scheduling a time for instantiating the first VM and the second VM to perform the respective service tasks; and selectively instantiating one of the first VM or the second VM to perform their respective service tasks to complete the one or more services of the respective first and second client.

In one embodiment, the method further comprises: instantiating the first VM to complete the service tasks associated with the one or more services of the first client; detecting a completion of the service tasks required to complete the one or more services of the first client; and responsive to detecting the completion: de-instantiating the first VM; checking whether the second VM is scheduled to complete the one or more services of the second client; and instantiating the second VM to complete the services of the second client at a time at which the second VM is scheduled to complete the one or more services of the second client, wherein multiple VMs operating on a same data processing system are uniquely assigned to multiple different clients to complete services specific to each of the multiple clients utilizing shared system resources while preventing conflicts in resource usage.

Further, in another embodiment, the method comprises: recording a start time at which completion of the one or were services of the first client is initiated; detecting an actual completion time at which the or more services of the first client completes on the first VM; recording a length of time for completion of the execution of the one or more services of the first VM; comparing the completion time to a pre-set end time for completion of the one or more services; when the completion time is earlier than the preset end time, determining a time difference between the preset end time and the completion time and identifying the time difference as an available time slot; and when a next VM requires less completion time than the available time slot, dynamically scheduling the next VM to be instantiated within the available time slot following the completion time of the one or more first services.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
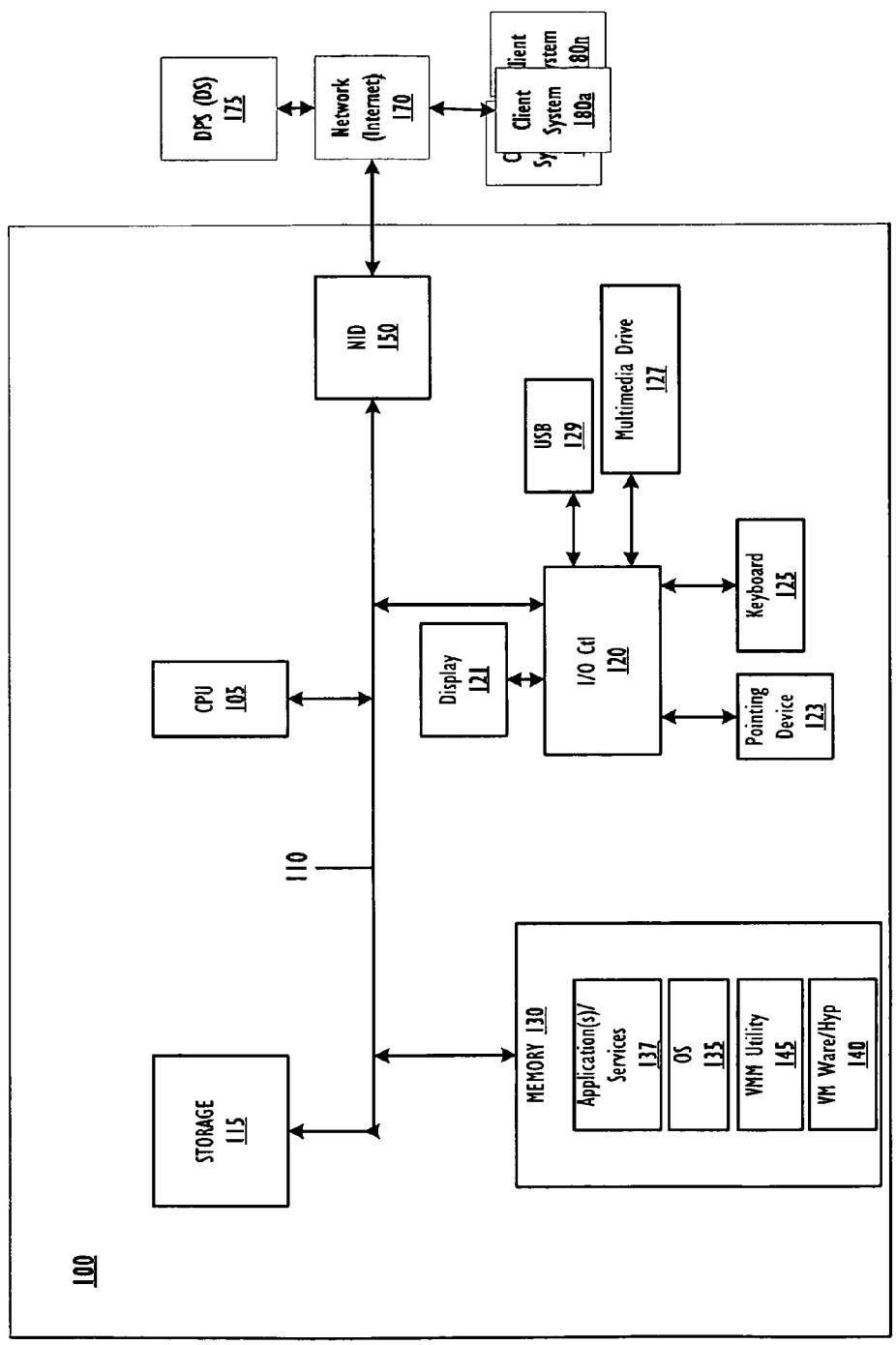
FIG. 1 is a block diagram of a data processing system configured with hardware, firmware and software components, including a virtual machines manager (VMM), for implementing one or more features provided by the illustrated embodiments.

The illustrative embodiments provide a method, a system and a computer program product for enabling provisioning of services to multiple clients via a single data processing system configured as multiple virtual machines with a virtual machine manager (VMM). The VMM performs several management functions, including (a) configuring/assigning each virtual machine (VM) for/to a specific, single client to create a client VM, (b) scheduling the time and order for completing client services via the assigned client VM, (c) instantiating a client VM at a scheduled time and triggering the execution of services tasks required for completing the specific client services on the client VM, (d) monitoring and recording historical information about the actual completion times of services on a client VM, and (e) updating a scheduling order for sequential instantiating of the multiple client VMs and corresponding client services, based on one or more of (i) pre-established time preferences, (ii) priority considerations, and (iii) historical data related to actual completion times of client services at a client VM.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of an example data processing system, which may be implemented as a server, distributed system, or stand alone system. DPS 100 comprises at least one processor or central processing unit (CPU), of which CPU 105 is illustrated. CPU 105 is connected to system memory 130 via system interconnect/bus 110. System memory 130 is defined as a lowest level of volatile memory, including, but not limited to, cache memory, registers, and buffers. Also connected to system bus 110 is I/O controller 120, which provides connectivity and control for input devices, of which pointing device (or mouse) 123 and keyboard 125 are illustrated, and output devices, of which display 121 is illustrated. Additionally, removable storage drives, e.g., multimedia drive 127 (e.g., CDRW or DVD drive) and USB (universal serial bus) port 129, are also coupled to I/O controller 120. Removable storage drives, such as multimedia drive 128 and USB port 126, allows removable storage devices (e.g., writeable CD/DVD or USB memory drive, commonly called a thumb drive) to be inserted therein and be utilized as both input and output (storage) mechanisms. DPS 100 also comprises storage 115, within which data/instructions/code may be stored.

DPS 100 is also illustrated with network interface device (NID) 150 coupled to system bus 110. NID 150 enables DPS 100 to connect to one or more access networks 170, such as the Internet. In one embodiment, DPS 100 represents an entire physical system, such that all operations occur on DPS 100 independent of any external hardware and/or software components. However, according to an alternate embodiment, DPS may be one of multiple systems within a distributed environment, where the collection of connected systems collectively provides a single image of a processing system. Within this later configuration, NID 150 may provide connectivity to a plurality of other systems that may each have additional processors and/or memory components, either via direct connection or through network 170. Thus, for example DPS 100 may be connected to DPS 175 in a distributed configuration that enables both DPS 100 and DPS 175 to share hardware and software resources and operated as a single computing system. For purposes of the invention, all references to a single processing system or a single computing system are assume to include both the stand alone DPS 100 as well as other configurations of distributed systems with multiple systems operating to providing a single computing/processing system. Additionally, NID 150 may provide connectivity to one or more client systems 180a-180n, representing individual clients/customers, each having specific services that are assigned to a specific, single VM, in accordance with the embodiments described herein.

Notably, in addition to the above described hardware components of DPS 100, various features of the invention are completed via software (or firmware) code or logic stored within memory 130 or other storage (e.g., storage 115) and executed by CPU 105. In one embodiment, data/instructions/code from storage 115 populates the system memory 130 prior to (or while) being executed by CPU 105. Thus, illustrated within memory 130 are a number of software/firmware components, including operating system (OS) 135 (e.g., Microsoft Windows®, a trademark of Microsoft Corp, or GNU®/Linux®, registered trademarks of the Free Software Foundation and The Linux Mark Institute, or Advanced Interactive eXecutive—AIX—, registered trademark of International Business Machines—IBM), applications (or services) 137. Also illustrated in memory are virtualization firmware 140 (e.g., VM Ware in a software-based virtualization implementation (see FIG. 2) and Hypervisor in a hardware-based virtualization implementation) and Virtual Machine Manager (VMM) utility 145. VMM utility 145 provides the functional components that implements the functional features of a VMM (see FIG. 3).

In actual implementation, VMM utility 140 may be provided/installed as a modification and/or enhancement to existing virtualization firmware 140, with the two software/firmware modules collectively providing the various functions of each individual software/firmware component when the corresponding code is executed by the CPU 105 (or service processor, in the hardware virtualization implementation). For simplicity, the VMM utility 140 is illustrated and described as a stand alone or separate software/firmware component, which is stored in system memory 106 to provide/support the specific novel functions described herein.

CPU 105 executes the VMM utility 140 as well as OS 130, which supports the user interface features of the VMM utility 140. In the illustrative embodiment, the VMM utility 140 generates/provides several graphical user interfaces (GUIs) to enable user interaction with, or manipulation of, the VM configuration and client services setup features provided by the utility (140). Among the software/firmware code/instructions provided by the VMM utility 140, and which are specific to the invention, are: (a) code for enabling the virtual machine manager to control/manage multiple virtual machines installed on the same computing/processing system; (b) code for configuring each virtual machine to provide one or more services to one customer at a time; (c) code for receiving input for identifying services and service tasks to be carried out by the configured virtual machine; (d) code for monitoring virtual machine operations and service completion times and dynamically updating one or more tables with actual completion time data; (e) code for instantiating and de-instantiating different virtual machines; (f) code for optimally scheduling completion of services by the different virtual machines based on pre-set scheduling criteria and real-time or historical data and priority assignments of the various client services; and (g) code for scheduling sequential running of the virtual machines for optimal usage of shared system resources based on analyses of historical data and customer/client services timing requirements. For simplicity of the description, the collective body of code that enables these various features is referred to herein as the VMM utility 140, and the features are described as being implemented by a VMM. According to the illustrative embodiment, when CPU 105 executes the VMM utility 140, DPS 100 initiates a series of functional processes that enable the above functional features as well as additional features/functionality, which are described below within the description of FIGS. 2-6.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
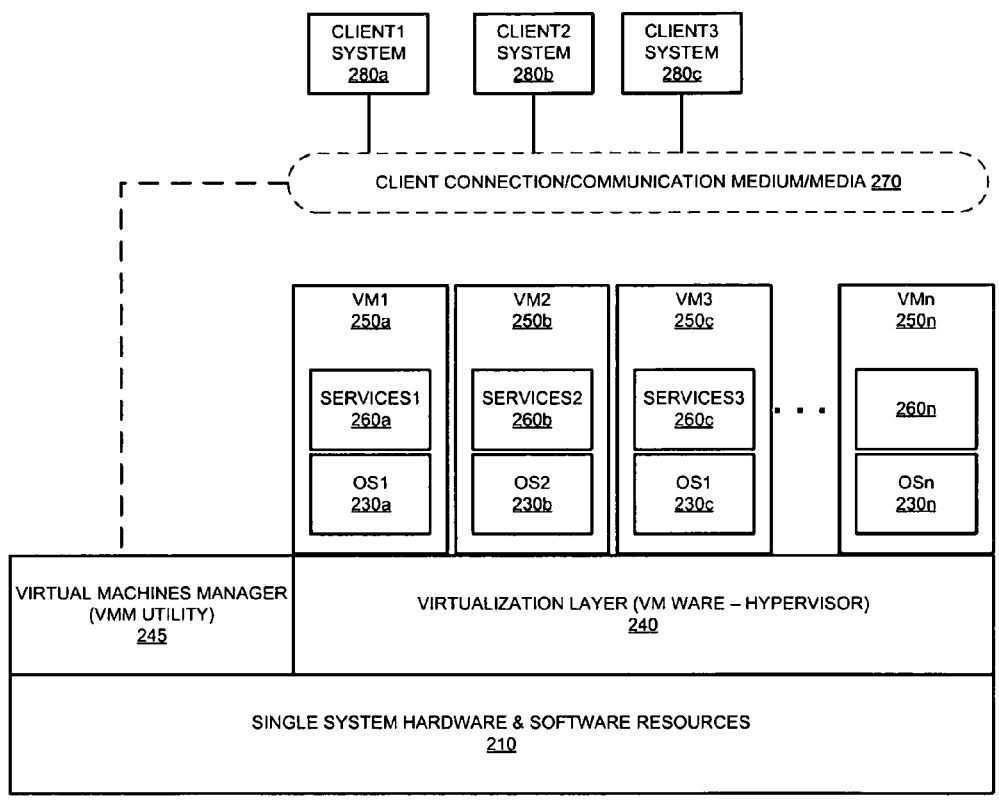
FIG. 2 is a block diagram illustrating the structure of a virtualization environment with a VMM provisioning shared resource services across multiple virtual machines (VMs) assigned to individual clients, in accordance with one embodiment.

With reference now to FIG. 2, there is illustrated an example configuration of a virtualization environment in which a VMM manages multiple VMs that are associated with individual clients. As shown, computing system 200 comprises single-system hardware and software resources 210, which are the shared resources, utilized by the virtual machines that are created within the virtualization environment. Positioned atop the hardware and software resources is virtualization firmware 240 (which, as described above, may comprise a software virtualization implementation, such as VMWare). Virtualization firmware 240 generates a plurality of VMs, of which VM1 250a, VM2 250b, VM3 250c through VMn 250n are illustrated. In this illustration, n represents an integer number of VMs that may be generated by the virtualization firmware 240, and n is finite. In addition to virtualization firmware 240, VMM 245 also executes atop the hardware and software resources and controls operation of the VMs 250a-n that are assigned to specific client services. In an alternate embodiment, VMM 245 may also run on the hardware and software resources of a different machine that is communicatively coupled to computing system 200.

It is important to note that in the described embodiments, the individual VMs are pre-established VMs that are then assigned to a specific customer by VMM 245. Accordingly, VMM 245 (and VMM utility 145) does not create additional VMs. Rather, as described below and illustrated by FIG. 3, a VM controller module (or sub-component) of VMM 245 sends signals to virtualization firmware 240 on the single computing system 200 to trigger virtualization firmware 240 to instantiate and de-instantiate various VMs that are running on the single computing system 200 so that the instantiated VM may provide the appropriate service to a given client/customer. VMM 245 uses a service-VM table (also illustrated within FIG. 3) in VMM's service database to determine which VM needs to be started or ended and at what time. VMM 245 then triggers the instantiation of the VM by sending a signal to the virtualization firmware 240 (e.g., a hypervisor application, such as VMWare™ ESX server), which controls the VMs. Thus, while described herein as a VMM initiated process, the instantiation and de-instantiation of the various virtual machines are not directly performed by VMM 245. Rather, VMM 245 simply issues a request for the VM to be instantiated or de-instantiated to the virtualization firmware 240. The request is provided to the virtualization firmware 240 through execution of commands on the processing system.

Each VM 250a-n includes a version of OS, OS1-OSn 230a-n executed by the particular VM and each VM 250a-n also includes one or more services that are completed by that VM on behalf of a specific client. Thus, for example, VM1 250a executes OS1 230a and also completes services1 260a, which are services required to be completed for a first client (client1). The services (services1) of the first client (client1) may be similar or different from those services of other clients (e.g., services2 of client2). Notably, services1 260a are completed only on VM1 250a and at a first scheduled time, while services2 260b are completed on VM2 250b at a second scheduled time, with no overlap in the times. In one embodiment, each VM 250a-n runs according to a particular schedule and no two VMs are run at the same time.

In an alternate embodiment, a hardware virtualization platform may be utilized to provide multiple logical partitions (LPARs) in a single computing system with limited system resources. Each service run (described in greater detail below) is implemented from one LPAR at a time to consume the limited system resources that enable the service run. After one service run is complete, the VMM utility 140 can trigger a next service run from a second LPAR that can use the same system resources. The activation of different LPARs is orchestrated to power different service runs for different clients/customers at different times.

Returning to FIG. 2, illustrated above VMs 250a-n is a client communication/connection medium 270, which may be any type of network connection mechanism that enables client systems, client1 system 280a, client2 system 280b and client3 system 280c to receive results of the services run on the respective VMs 250a-c when those results are directly communicated to the clients. Client systems 280a-c may be data processing systems or other types of electronic devices that are capable of receiving the results via the client communication/connection medium 270. A communication channel may be established directly between each client system (280a-c) and its respective VM (250a-c); However, in another or an alternate embodiment, communication may be established between client systems 280a-c and VMM 245, or vice versa.

Figure 3:
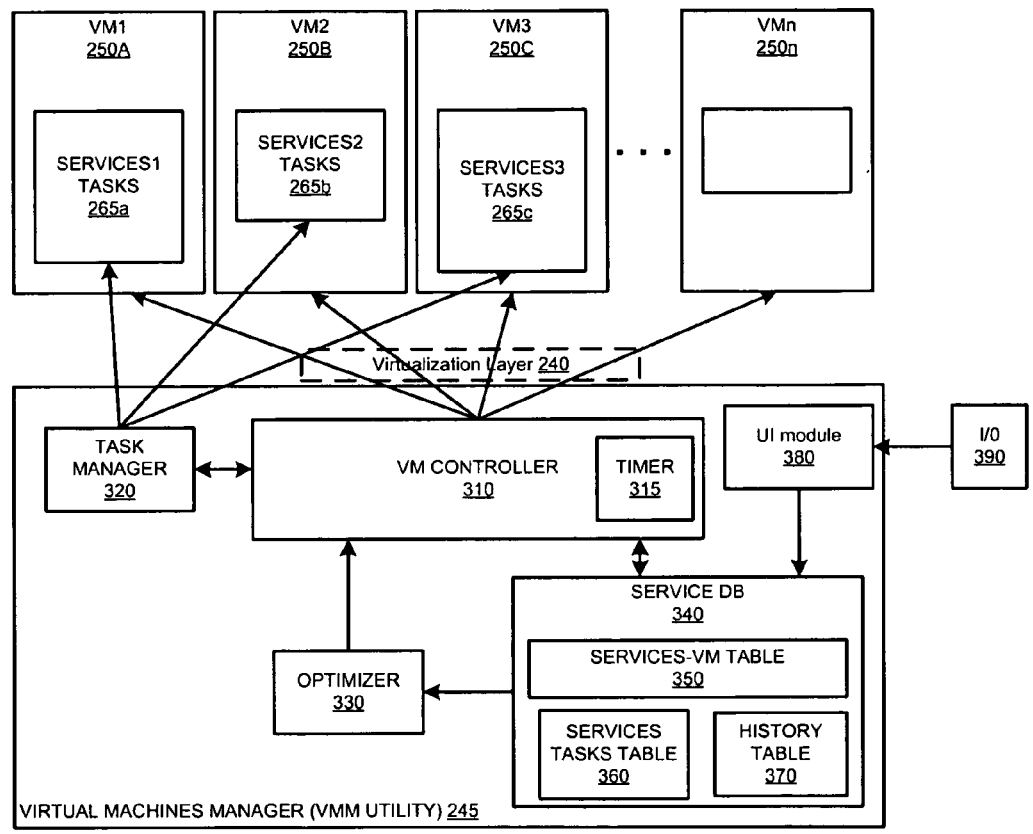
FIG. 3 is a block diagram illustration of the functional modules/components that operated within an example VMM and the interaction of VMM modules/components with the multiple VMs controlled/managed by the VMM, according to one embodiment of the invention.

FIG. 3 provides a more detailed view of the different functional modules/components that make up VMM 245 (FIG. 2 and/or VMM utility 145, FIG. 1) and enables the various functions related to shared service provisioning, as described herein. VMM 245 comprises VM controller 310, task manager 320, optimizer 330, and service database (DB) 340. The functionality associated with each of these primary components of VMM 245 are described in greater detail in the following paragraphs. Support for the user interface features of VMM 245 is provided by user interface (UI) module 380, which receives input from one or more input mechanisms, illustrated generally as I/O 390. In one embodiment, UI module 380 generates a graphical user interface (GUI) by which VM, client, services, and/or task information may be added, deleted, edited. The information provided within the GUI is then captured and persisted within service DB 340.

As shown, service DB 340 comprises three tables, service-VM table 350, which stores service to VM mapping information (e.g., client identifier (ID) and specific services assigned to a particular VM), services-tasks table 360, which stores a mapping of the various services tasks required to be executed/carried out in order to complete the service(s) for a particular client/customer, and history table 370, which stores historical information related to the time of completion of each service during execution on the respective VMs. History table 370 enables VM controller 310 to track how long each VM was active and how long the VM took to perform the various tasks for a given service or set of services.

VM controller uses service-VM table 350 in service DB 340 to determine which VM needs to be started or ended and at what time. An example service-VM table with an example set of data is provided within the following table.

TABLE I

| CLIENT ID | VM ASSIGNED | SERVICES | SERVICES TASKS | START TIME | END TIME | TIME BLOCK | SCHEDULING PRIORITY |
|---|---|---|---|---|---|---|---|
| CLIENT1 | VM1 | S1 | A, B, C | 2:00 AM | 6:00 AM | | 1 |
| CLIENT2 | VM2 | S2, S4 | B, D | | | 2 HRS | 2 |
| CLIENT3 | VM3 | S1 | A, B, C | | | 4 HRS | 1 |

As shown by Table I, three different clients (Clients 1, 2, and 3) are each assigned to a different VM (VM 1, 2, and 3). Client 1 and Client 3 require completion by their respective VM of service S1, while Client 2 requires completion of services S2 and S4 by its assigned VM, VM2. Completion of service S1, requires execution of service tasks A, B, and C, while completion of service S2 and S4 requires execution of service task B and D, respectively (S2-B, S4-D). Completion of Service S1 by VM1 is scheduled based on pre-set start and end times. However, completion of S1 by VM3 as well as completion of S2 and S4 by VM2 does not depend on a preset start time and can be completed at any available time(s) at which no other VM is operation. With no pre-established scheduling time, the services, S1 and S2 and S4 are referred to as un-constrained services and are capable of being schedule for completion at any available time that is long enough to complete the particular service(s) of the particular client. Completion of S2 and S4 by VM2 is constrained to a two hour period (i.e., the client VM is only allowed to execute S2 and S4 service tasks B and D for a maximum period of two continuous hours at a time), while completion of S1 by VM1 is constrained to a four hour period.

The final column of Table I stores a priority designation for each VM and/or for completion of specific client service. In some implementations, no priority information is provided and this field is left blank. As shown by the example set of data, Client 1 and Client 3 each have a priority value of 1 (or high priority), while Client 2 has a lower priority value of 2. During scheduling operations (by the optimizer), the service VM for Client 1 is always scheduled at the preset time. However, the service VM for Clients 2 and 3 are schedule based on considerations of the assigned priority value, in addition to other factors, as described further below.

Returning now to FIG. 3, as indicated by the directional arrows originating from VM controller 310, VM controller 310 executes commands on the shared computing system to instantiate and de-instantiate the multiple VMs 250a-n that are serially running (i.e., one at a time) on the computing device. Specifically, and as described with reference to FIG. 2, VMM 245 triggers the instantiation of the VMs 250a-n by sending a signal to the virtualization firmware 240 (e.g., a hypervisor application, such as VMWare™ ESX server), which controls the VMs. Thus the instantiation and de-instantiation of the VMs 250a-n are actually performed by virtualization firmware 240. However, for simplicity of describing the VMM functions, the description herein will refer to VMM 245 instantiating and de-instantiating the VMs, with the understanding that the process involves VMM 245, and specifically VM controller 310, sending commands to trigger virtualization layer 240 (shown with dashed lines breaking up the directional arrows from VM controller 310) to perform the particular action. The following represents an example of the process description. For client "A", VMM 345 instantiates "VM A" and triggers the scanning service tasks for client "A" from "VM A". Once the scan is complete, VM controller 310 de-instantiates "VM A" and instantiates "VM B" to provide the same service or some other service to client "B", until all services for a given time period have been completed.

VM controller 209 includes timer 315, which enables VM controller to (a) schedule instantiation of VMs at pre-set times, (b) track a length of time for completing the client services of each client VM, and (c) calculate available time slots for scheduling additional/new client services for other clients. The applicability of these features is further described below with reference to FIG. 6. Using the data received from the timer 315 and/or from user interface 380, VM controller 310 creates and maintains/updates service DB 340.

Task manager 320 of VMM 345 is responsible for managing tasks within a specific VM of the multiple VMs 250a-n. When instantiated, the particular VM, among the multiple VMs 250a-n (e.g., VM1 250a) receives specific services tasks (e.g., services1 tasks 265a) corresponding to the service(s) being performed for the particular client. When a VM has not been assigned to a particular client, e.g., VMn 250n, no specific services tasks are allocated to the VM when/if the VM is instantiated, as indicated by the empty services tasks box within VMn 250n.

Once VM controller 310 has started a VM, e.g., VM1 250a, VM controller 310 triggers the task manager 320 to start the services tasks 265a (e.g., A, B, C from Table I) that are needed to be carried out for the particular service (e.g., S1) being completed by VM1 250a. Task manager 320 manages tasks within a specific VM. In one embodiment, task manager 320 starts the tasks and determines when the tasks are completed. When the tasks are completed, a signal is sent by task manager 320 to VM controller 310.

Optimizer 330 uses the information in the service database 212 to optimize the scheduling of different VMs (250a-n) and the execution of the corresponding service tasks 265a-n so that the system resources are fully utilized without causing conflicts due to overlapping times for service completion (or VM instantiation). As an example, assume "service 1" on VM1 250a has to be performed at 12:00 P.M. and is predicted to take 5.5 hours. Also assume that "Service 2" on VM2 250b has to be performed at 6:00 P.M. VM controller 310 schedules "service 1" on VM1 250a at 12:00 P.M. and "service 2" on VM2 250b at 6:00 P.M. VM controller 310 continuously tracks the completion times for each VM via timer 315. If, after one or more iterations of services completion on VM1 250a, VMM 245 (via VM controller 310 and/or optimizer 330) determines that VM1 250a has historically completed the assigned tasks of service 1 by 3:00 P.M., VMM 245 (i.e., optimizer 330) reviews the services-VM table 350 and the history table 370 and will attempt to locate a service that has no specific timing requirements and usually completes in less than three hours (since the early completion of the tasks on VM1 250a leaves an available time slot for resource re-allocation of about three hours before VM2 requires access to the resources to complete service 2). Assuming such a service is found within the scheduled services in services-VM table 350, VMM 245 (via optimizer 330) will fit this service between "service 1" on VM1 250a and "service 2" on VM2 250b, thus enabling use of idle resources.

Thus, generally, VMM 245 operating through one or more of the various modules/components, e.g., VM controller 310, manages and schedules sequenced instantiation of multiple virtual machines (VMs) 250a-n supported by the shared resources of a same physical computing system (e.g., a shared server). Each VM is configured to provide service to one customer at a single time. The VMM 245 keeps track of the clients, the assigned VM per client, the services that need to be provided to each client account, and the service tasks required for completing each service. The sequenced running of the multiple VMs 250a-n is scheduled based on stored data within one or more tables in a services DB 340. In one embodiment, a queuing feature may be implemented by which a next service to be completed and by association, the next VM to be instantiated is allocated to a spot in an ordered queue, where the service VM at the top of the queue is the next VM instantiated. Some ordering mechanism (such as the optimizer 330 of FIG. 3) for changing a relative placement of a service VM within the queue would then be provided. The ordering mechanism would evaluate a plurality of queue ordering parameters, such as historical data, current resource available time slots, assigned priority of scheduled service VMs relative to each other, and others. Ultimately, the VMM enables completion of a large number of disparate service tasks for a plurality of different clients/customers by provisioning the shared resources of a single computing device configured with multiple VMs, uniquely assigned to specific ones of the clients/customers.

Figure 4:
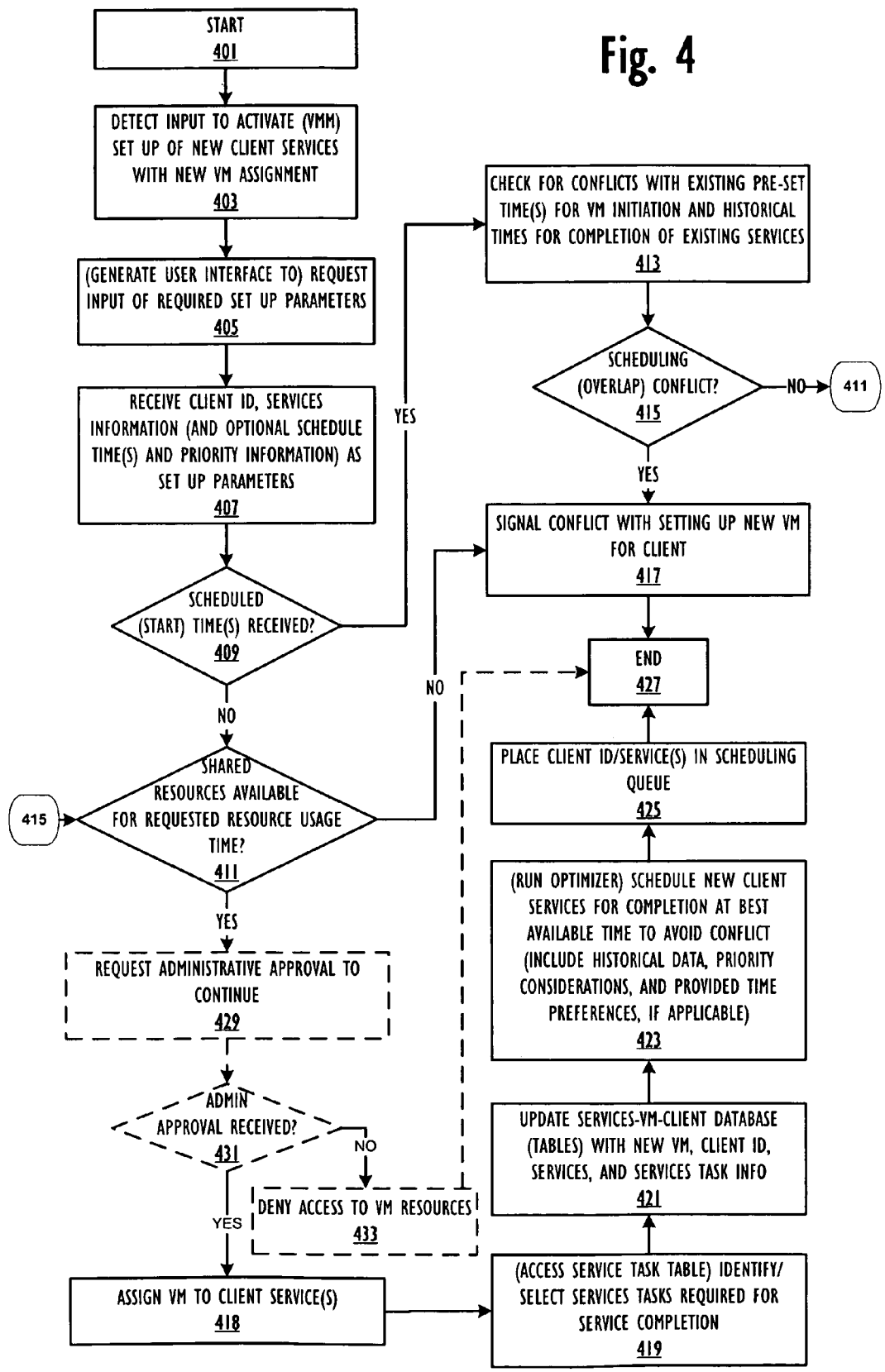
FIG. 4 is a flow chart of a method by the VMM configures a VM to support services and corresponding services tasks of a single client, according to one embodiment.
Figure 5:
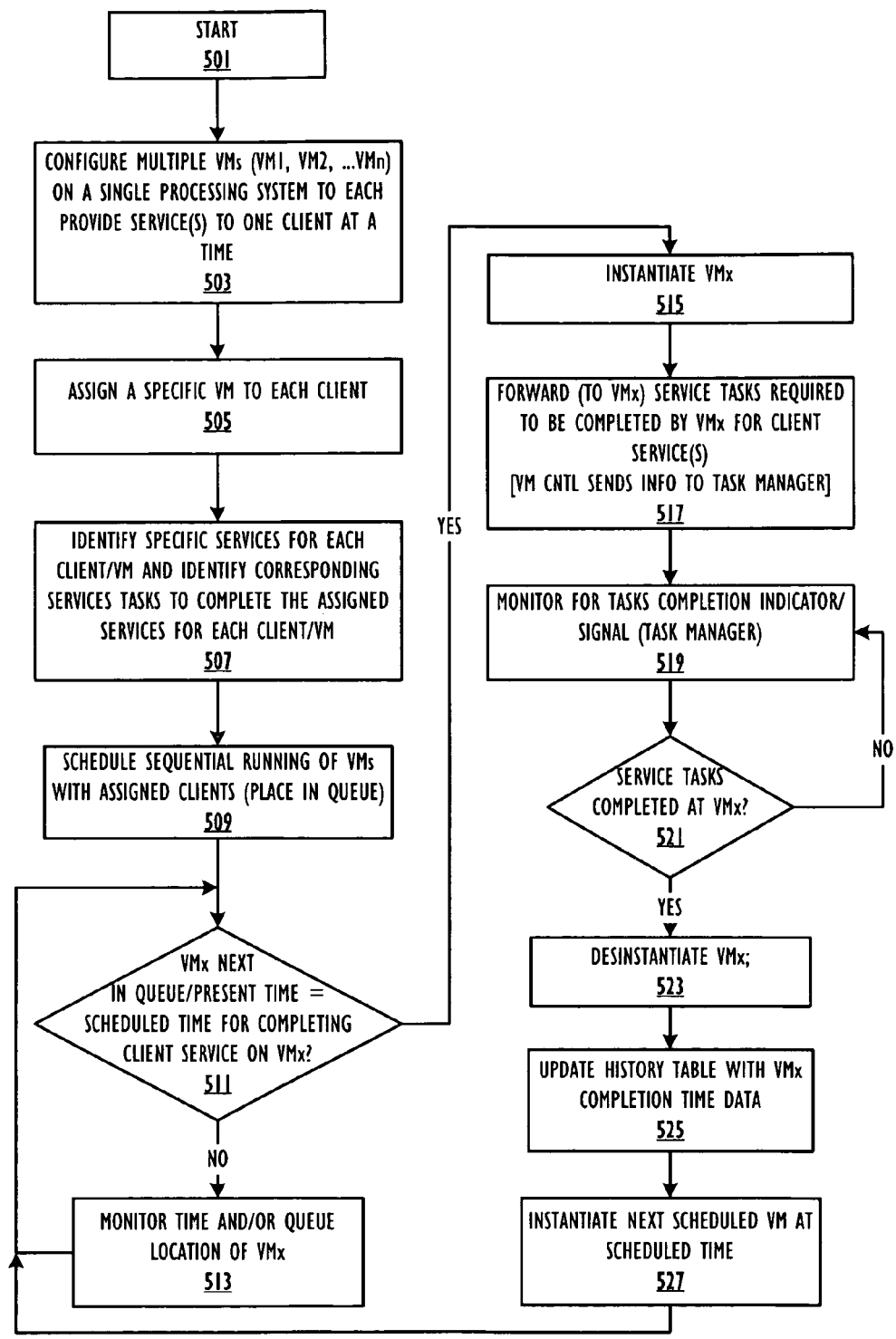
FIG. 5 is a flow chart of a method by which the VMM configures, schedules, and instantiates multiple VMs to sequentially execute service tasks corresponding to the services supported by the instantiated VM, according to one embodiment.
Figure 6:
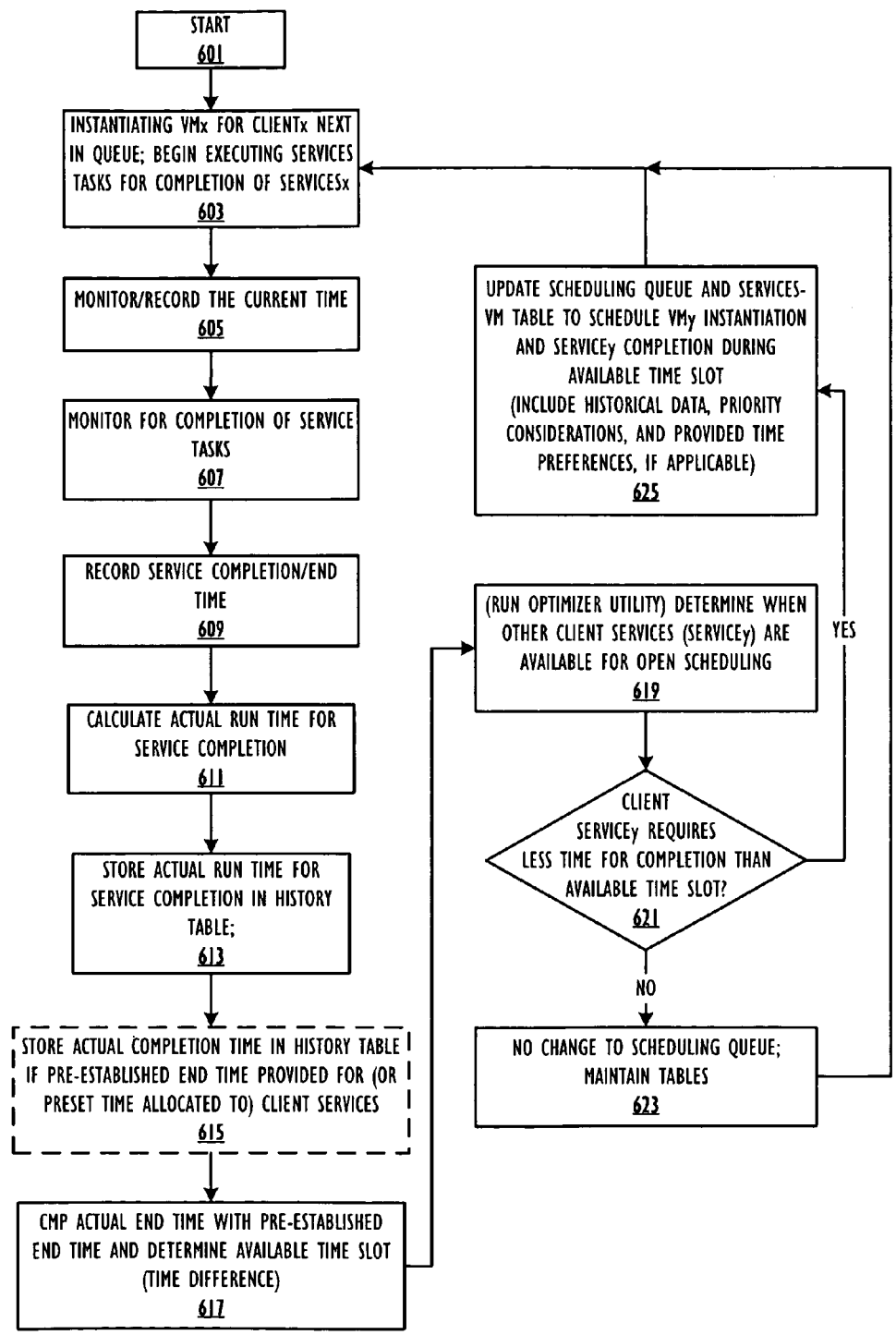
FIG. 6 is a flow chart of a method by which the VMM updates the history table and optimizes the scheduling of the multiple VMs relative to each other based on historical data, client and/or service priority considerations, and available timing parameters, according to one embodiment.

FIGS. 4-6 are flow charts illustrating one or more methods by which the above processes of the illustrative embodiments are completed. Although the methods illustrated in FIGS. 4-6 may be described with reference to components shown in FIGS. 1-3, it should be understood that this is merely for convenience and alternative components and/or configurations thereof can be employed when implementing the method. Key portions of the methods may be completed by the VMM utility 145 executing within DPS 100 (FIG. 1) to generate functions of a VMM 245 (FIG. 2) and controlling specific operations of/on DPS 100, and the methods are thus described from the perspective of either/both the VMM utility 140 and VMM 245.

As will be reflected by the below described flow charts, the method generally enables discrete provisioning of shared hardware and software resources of a single data processing system to complete services for multiple different clients via uniquely assigned virtual machines (VMs) configured on the single data processing system, while maintaining security and privacy for each client. The method comprises: assigning one or more first services corresponding to a first client to a first virtual machine (VM) from among the multiple VMs configured on the single data processing system; assigning one or more second services corresponding to a second client to a second VM configured on the single data processing system; and dynamically scheduling serial completion of services for respective clients by triggering a first instantiation of the first VM to complete the one or more first services during a first time period and a second instantiation of the second VM to complete the one or more second services during a second time period that is different from the first time period, wherein the first time period does not overlap with the second time period and the shared hardware and software resources are utilized for completing client services by only one VM at a time.

Additional features of the method provides: identifying first service tasks required to complete the one or more first services of the first client and second service tasks required to complete the one or more second services of the second client; when the instantiation of the first VM occurs, forwarding the first service tasks to the first VM for execution of the first service tasks on the first VM; and when the instantiation of the second VM occurs, forwarding the second service tasks to the second VM for execution thereon.

In one embodiment, the dynamically scheduling comprises: receiving a signal indicating completion of one of the first service tasks on the first VM or the second service tasks on the second VM; and responsive to receipt of the signal: de-instantiating a corresponding one of the first VM or the second VM; evaluating scheduling criteria for completing a next service waiting to be completed; and when a time for completing the next service arrives, triggering an instantiation of a next VM on the single data processing system to complete the next service.

Further, the method includes: recording one or more characteristics of the one or more first services and the one or more second services within a services database; tracking actual completion characteristics of the one or more first services and the one or more second services; updating the services database with the actual completion characteristics to generate a historical record; and dynamically modifying a schedule for completing at least one of the one or more first services, the one or more second services, or the next service based on the historical record of actual completion characteristics. The tracking monitors a start time and an end time for execution of the first service tasks and the second service tasks on the respective first VM and second VM; and when an actual end time for executing at least one of the first service tasks on the first VM or the second service tasks on the second VM is different from a pre-set end time scheduled for a corresponding one or more first services or one or more second services: recording the actual end time within the historical record; determining an available time between the actual end time and a next scheduled time at which a following service is scheduled for completion; comparing the available time to one or more completion times required for corresponding one or more un-constrained services that require scheduling for completion and which do not have specific time constraints, such as a specific start time or end time; and when an un-constrained service has a completion time that is less than the available time, such that the un-constrained service can be completed during the available time on an assigned next VM, updating a scheduling sequence to serially instantiate the next VM to complete the un-constrained service sequentially after the actual end time recorded.

In one embodiment, the method further comprises: evaluating each of a plurality of available times, representing (a) times during which no service with a pre-set start time is schedule for completion and (b) available time based on a historical time of completion of a time-scheduled service that completes before the pre-set end time; comparing the available times against a required completion time for an un-constrained service with flexible scheduling requirements; when only one available time exists to complete the unconstrained service, scheduling the service for completion by an associated VM at the one available time; and when more than one available times exist during which the unconstrained service may be completed: dynamically selecting a best available time from among the available times to complete the un-constrained service; and scheduling the service for completion by a next VM assigned to that un-constrained service during the best available time selected; wherein a best available time is determined by evaluating one or more factors, including an evaluation of: a relative priority of the un-constrained service relative to each other unconstrained service; specific services tasks executed by other services serially completed with the un-constrained service; preferred time for completing the unconstrained service; and maintenance schedules for specific resources required by the next VM to complete the unconstrained service.

According to one implementation, the method comprises: receiving a first input with first parameters identifying the one or more first services and the first client and a second input with second parameters identifying the one or more second services and the second client; generating a services database entry for each of the first parameters and the second parameters within a services database; wherein, when at least one of the first parameters and the second parameters includes scheduling related information: the generating includes linking the scheduling related information to respective, corresponding first or second services within the services database entry; and updating a scheduling order for completing the one or more first service and the one or more second services based on the scheduling related information; and wherein the assigning comprises configuring the first VM to provide service to only the first client and configuring the second VM to provide service to only the second client, wherein the first VM is linked to an identification (ID) of the first client, and the first services and associated first service tasks are linked to the first VM within the services database and wherein the second VM is linked to an identification (ID) of the second client, and the second services and associated second service tasks are linked to the second VM within the services database. Additionally, the method provides for: identifying the one or more services tasks required for completing the one or more first services and the one or more second services; incorporating the one or more services tasks into respective database entries of corresponding one or more first services and one or more second services; subsequently forwarding the one or more services tasks for completion on the corresponding first VM or second VM based on the scheduling order within the services database; wherein the first VM and the second VM are serially instantiated without any overlap in resources usage among the first VM and the second VM during completion of respective first service tasks and second service tasks; recording a length of time for completion of services on each assigned VM; when the scheduling related information of a service includes pre-set scheduling time information, detecting an actual completion time for the service; and updating the services database with the actual completion time.

Further, in one embodiment, the method includes: assigning, based on input parameters, a relative priority value to at least one service scheduled for completion; and selectively scheduling completion of the at least one service via instantiation of a corresponding VM relative to a completion of other services based on (a) preset times required for completing the particular services, (b) a historical length of time for completing services on each VM, and (c) the relative priority value of the at least one service compared to priority values of other services.

Finally, the method comprises: receiving input parameters to configure an idle VM to support identified services for a new client; evaluating one or more scheduling parameters within the input parameters and comparing the one or more scheduling parameters against currently available times for scheduling completion of the identified services for the new client, wherein the scheduling parameters include one or more of a preset start time, a preset end time, a length of contiguous time required for completing the service, and an assigned priority; when there is available time to schedule the completion of the identified services for the new client without any conflicts in resource usage with existing, previously scheduled services: configuring the idle VM as a new client VM to support the new client; scheduling the identified services of the new client for completion via the new client VM based on one or more factors, which includes the preset start time, available times, and assigned priority; and updating one or more tables within a services database to record information about the new client, new client VM, services of the new client, and scheduling information for the identified services; and when there is no available time to schedule the identified service or a conflict is detected in a scheduling information received for the new client, generating and issuing a signal to trigger re-scheduling of the one or more new client services.

Turning now to the flow charts, the process of FIG. 4 describes the setting up of a new service for completion by an assigned VM within an existing virtualized environment. The process begins at initiator block 401 and proceeds to block 402, at which VMM is activated to set up new client services for completion by individual VMs configured on an existing virtualized computing device. The VMM generates one or more user interfaces to request input of parameters required to set up a client VM, as shown at block 405. At block 407, VMM receives the set up parameters, including client identifier (ID), services requested by the client, and services tasks for completing the requested services. In one embodiment, VMM also receives scheduling and priority information, which both represents optional set up parameters.

At block 409, VMM determines whether the received set up parameters included a specific start time for scheduling the service completion. If the set up parameters includes a specific start time, VMM checks with the existing servicing schedules for conflicts, as provided at block 413. Notably, VMM also takes into consideration the historical data within the history table of existing services completion times so that only actual conflicts may be detected. For example, a perceived conflict with a start time of 3 P.M. would not be an actual conflict if the service scheduled to begin at 12:00 P.M. with a 4 hour completion window, actually completes by 2:30 P.M., historically speaking. VMM thus determines at block 415 whether there are any true time conflicts that need to be addressed. When no conflicts exist, the process proceeds to block 411. When a conflict does exist, however, VMM generates a signal to request a system administrator resolve the conflict (block 417).

Returning to decision block 409, if there is no specific start time provided, the new client service is capable of being scheduled via open scheduling, based on a best available time slot for scheduling the completion of the client services. VMM also determines, at block 411, whether there are shared resources available for the required service completion time. This determination is performed to prevent the allocation of a new service when there is no bandwidth available to schedule the completion of the service tasks on the computing device (i.e., all resource usage times are being utilized or not enough resource usage time remains to complete the requested service). Assuming that there is no more available shared resource bandwidth, VMM generates a signal indicating that the requested service cannot be performed on the computing device (of that a conflict exists with previously scheduled services), as shown at block 417. Then the process ends at block 425.

However, if at block 411, VMM determines that there is sufficient bandwidth to schedule the new service, VMM then assigns a specific VM to complete the services for the new client at block 418, and VMM selects and/or identifies the service tasks required to complete the service, as provided at block 419. VMM also stores the received set up parameters, the VM assignment, and the information about the services tasks within the services database, in one or more tables, at block 421. If the new client service has open scheduling (i.e., no pre-set start time), the optimizer of the VMM is able to dynamically modify/update when the particular client services are scheduled for completion as data about the completion times for other services are received. The optimizer may also select a best available initial scheduling time (location in the scheduling queue) for the new client services based on several other factors, such as historical completion time data of other client services and assigned priority of the new client services, as indicated in block 423. The specific client is then placed in the scheduling queue for completion of the service (s) of that client by the assigned VM, as shown at block 425. The process then ends at block 427.

The flow chart of FIG. 5 describes the process by which multiple VMs on a same processing device are configured for resource service provisioning. FIG. 5 also illustrates the process by which the VMs are sequentially instantiated and de-instantiated based on queue position and/or scheduled time for service completion. The process begins at block 501 and proceeds to block 503 at which VMM configures multiple VMs on a single processing system to complete the service(s) of a single client. At block 505, VMM assigns a specific VM to each client. Then at block 507, VMM receives an input of the specific services required to be completed for each client (on the specifically assigned VM), and VMM identifies the services tasks corresponding to the specific services. VMM then schedules sequenced/serial (i.e., one at a time) running of the VMs that have been assigned to specific clients, as shown at block 509. The client or VM identifier may be placed in a queue, in one embodiment.

At decision block 511, VMM determines which VM is the next VM (VMx) in the queue to be instantiated. Alternatively, VMM may determine whether the current time (e.g., 12:00 P.M. is the time at which a particular client service is scheduled to be completed. If there is no scheduled or queued VM for activation, VMM continues to monitor the time and/or queue location to determine when running of the next VM should be instantiated, as provided at block 513. Assuming the VM is next in queue for activation (e.g., the scheduled time for service completion arrives), VMM instantiates the VM (VMx), as shown at block 515. Once the VM is instantiated, VMM forwards to the VM the specific service tasks required to complete the client services on the VM, at block 517. Then, at block 519, VMM monitors for receipt of a task completion indicator/signal from the VM, and VMM determines at block 521 if the task completion indicator/signal is received.

When VMM receives the task completion indicator/signal, VMM de-instantiates the VM, as shown at block 523. VMM also updates the history table with completion data from the VM, as provided at block 525. The completion data may include actual completion time, length of time to complete the services tasks, and the like. VMM then reviews the service-WM table to instantiate the next scheduled VM at the time the next VM is scheduled to be instantiated, as shown at block 527. The process then returns to block 511.

FIG. 6 is a flowchart showing a method by which VMM (through VM controller and optimizer functionality) updates and/or modifies the order of scheduling the completion of services based on monitoring of actual completion characteristics and recording of historical data, according to one embodiment. The process begins at block 601, and proceeds to block 603 at which the VMM instantiates the VM of the next scheduled client service (in scheduling queue). The VMM also forwards the corresponding services tasks for execution by the VM in order to complete the client service. At block 605, VMM monitors and/or records the start time for the execution of the services tasks (or the time of instantiation of the VM). VMM also monitors for the completion of the services tasks, as indicated at block 607, and VMM records the service completion time at block 609. At block 611, VMM calculates the actual run time for service completion on the VM. VMM stores the actual run time in the services-VM table and/or the history table, as provided at block 613. VMM may also optionally store the actual completion time in the services-VM and/or history table, as shown by block 615. However, this embodiment assumes that VMM is programmed to update one or more pre-set end times based on actual, monitored completion time data.

At block 617, VMM compares the actual end time with a pre-established end time, and VMM determines an available time slot, based on the difference in the two times. In an alternate embodiment, VMM compares the actual run time (e.g., 2 hours) with the pre-set allocated timed (e.g., 4 hours) for completing a client service. VMM then runs the optimizer function, which first checks for other client services that are available for open slot scheduling (i.e., there is no pre-established start time at which the client service has to be initiated), as shown at block 619. At decision block 621, VMM determines whether the other client service with open slot scheduling has a completion time (i.e., the time for which the client service requires access to the shared resources via the assigned VM) that is less than the available time slot that was left by the previous client service. As shown at block 623, no change is made to the scheduling queue when either (a) there is no available time slot or (b) none of the other client services can be re-assigned to the available time slot without resource-usage conflicts or breach of pre-set time restrictions. However, when the other client service requires less time than the available time slot, the VMM (through optimizer) updates the scheduling queue and the services-VM table to schedule the instantiation of the next VM and subsequent completion of the other services during the available time slot, as shown at block 625. In one embodiment, the optimizer takes several other factors into consideration before adjusting the scheduling queue, including, for example, historical data, relative priority considerations, and pre-set preference times for scheduling.

In the flow charts above, methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes record able type (tangible) media such as floppy disks, thumb drives, hard disk drives, CD ROMs, DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for enabling discrete provisioning of shared hardware and software resources of a single data processing system to complete services for multiple different clients via uniquely assigned virtual machines (VMs) configured on the single data processing system, while maintaining security and privacy for each client, the method comprising:

a processor of the single data processing system assigning a first one or more services corresponding to a first client to a first virtual machine (VM) from among the multiple VMs configured on the single data processing system;

the processor assigning a second one or more services corresponding to a second client to a second VM from among the multiple VMs configured on the single data processing system;

the processor configuring the first VM to provide service to only the first client and configuring the second VM to provide service to only the second client, wherein the first VM is linked to an identification (ID) of the first client, and wherein the second VM is linked to an identification (ID) of the second client; and the processor dynamically scheduling serial completion of services for respective clients by triggering an instantiation of the first VM to complete the first one or more services during a first time period and an instantiation of the second VM to complete the second one or more services during a second time period that is different from the first time period, wherein the first time period does not overlap with the second time period and the shared hardware and software resources are utilized for completing client services by only one VM at a time.

2. The method of claim 1, further comprising:
the processor identifying first service tasks required to complete the first one or more services of the first client and identifying second service tasks required to complete the second one or more services of the second client, wherein the first service tasks are linked to the first VM within a services database, and wherein the second service tasks are linked to the second VM within the services database;
the processor, in response to the instantiation of the first VM, forwarding the first service tasks to the first VM for execution of the first service tasks on the first VM; and
the processor, in response to the instantiation of the second VM, forwarding the second service tasks to the second VM for execution on the second VM.

3. The method of claim 2, wherein said dynamically scheduling comprises:
the processor receiving a signal indicating completion of one of the first service tasks on the first VM and the second service tasks on the second VM; and
responsive to receipt of the signal:
the processor de-instantiating a corresponding one of the first VM and the second VM;
the processor evaluating scheduling criteria for completing a next service waiting to be completed; and
the processor, in response to arrival of a time for completing the next service, triggering an instantiation of a next VM on the single data processing system to complete the next service.

4. The method of claim 3, further comprising:
the processor recording one or more characteristics of the first one or more services and the second one or more services within the services database;
the processor tracking actual completion characteristics of the first one or more services and the second one or more services;
the processor updating the services database with the actual completion characteristics to generate a historical record; and
the processor dynamically modifying a schedule for completing at least one of the first one or more services, the second one or more services, and the next service based on the historical record of actual completion characteristics.

5. The method of claim 4, further comprising:
the processor monitoring a start time and an end time of execution of the first service tasks and the second service tasks on the respective first VM and second VM; and
the processor, in response to an actual end time for executing at least one of the first service tasks on the first VM or at least one of the second service tasks on the second VM being different from a pre-set end time scheduled for a corresponding at least one of the first one or more services or at least one of the second one or more services:
the processor recording the actual end time within the historical record;
the processor determining an available time between the actual end time and a next scheduled time at which a following service is scheduled for completion;
the processor comparing the available time to one or more completion times required for a corresponding one or more un-constrained services that require scheduling for completion and which do not have specific time constraints; and
the processor, in response to an un-constrained service having a completion time that is less than the available time, such that the un-constrained service can be completed during the available time on an assigned next VM, updating a scheduling sequence to serially instantiate the next VM to complete the un-constrained service sequentially after the actual end time recorded.

6. The method of claim 1, further comprising:
the processor evaluating each of a plurality of available times, representing (a) times during which no service with a pre-set start time is scheduled for completion and (b) available time based on a historical time of completion of a time-scheduled service that completes before a pre-set end time;
the processor comparing the available times against a required completion time for an un-constrained service with flexible scheduling requirements; and
the processor, in response to there being only one available time, to complete the un-constrained service, scheduling the un-constrained service for completion by an associated VM at the one available time.

7. The method of claim 1, further comprising:
the processor receiving a first input with first parameters identifying the first one or more services and the first client and a second input with second parameters identifying the second one or more services and the second client;
the processor generating a services database entry within a services database for each of the first parameters and the second parameters;
wherein, in response to at least one of the first parameters and the second parameters including scheduling related information:
said processor generating includes the processor linking the scheduling related information to respective, corresponding first or second services within the services database entry; and
the processor updating a scheduling order for completing the first one or more services and the second one or more services based on the scheduling related information.

8. The method of claim 7, further comprising:
the processor identifying one or more services tasks required for completing the first one or more services and the second one or more services;
the processor incorporating the one or more services tasks into respective database entries corresponding to the first one or more services and the second one or more services;
the processor subsequently forwarding the one or more services tasks for completion on the corresponding first VM or second VM based on the scheduling order within the services database, wherein the first VM and the second VM are serially instantiated without any overlap in resources usage among the first VM and the second VM during completion of respective first service tasks required for completing the first one or more services and second service tasks required for completing the second one or more services;
the processor recording a length of time for completion of services on each assigned VM;

the processor, in response to the scheduling related information of a service including pre-set scheduling time information, the processor detecting an actual completion time for the service; and the processor updating the services database with the actual completion time.

9. The method of claim 1, further comprising:

the processor assigning, based on input parameters, a relative priority value to at least one service scheduled for completion; and the processor selectively scheduling completion of the at least one service via instantiation of a corresponding VM relative to a completion of other services based on (a) preset times required for completing particular services, (b) a historical length of time for completing services on each VM, and (c) the relative priority value of the at least one service compared to priority values of other services.

10. The method of claim 1, further comprising:

the processor receiving input parameters to configure an idle VM to support identified services for a new client;

the processor evaluating one or more scheduling parameters within the input parameters and comparing the one or more scheduling parameters against currently available times for scheduling completion of the identified services for the new client, wherein the scheduling parameters include one or more of a preset start time, a preset end time, a length of contiguous time required for completing the service, and an assigned priority; and in response to there being available time to schedule the completion of the identified services for the new client without any conflicts in resource usage with existing, previously scheduled services:

the processor configuring the idle VM as a new client VM to support the new client;

the processor scheduling the identified services of the new client for completion via the new client VM based on a plurality of factors, the plurality of factors including the preset start time, available times, and the assigned priority; and the processor updating one or more tables within a services database to record information about the new client, new client VM, services of the new client, and scheduling information for the identified services.

11. A computer program product comprising:

a computer readable storage device; and program code stored on the computer readable storage device that when executed on a data processing system performs a series of functions to enable discrete provisioning of shared hardware and software resources of a single data processing system to complete services for multiple different clients via uniquely assigned virtual machines (VMs) configured on the single data processing system, while maintaining security and privacy for each client, wherein said program code stored on the computer readable storage device comprises:

program code to assign first one or more services corresponding to a first client to a first virtual machine (VM) from among the multiple VMs configured on the single data processing system;

program code to assign a second one or more services corresponding to a second client to a second VM from among the multiple VMs configured on the single data processing system;

program code to configure the first VM to provide service to only the first client and to configure the second VM to provide service to only the second client, wherein the first VM is linked to an identification (ID) of the first client, and wherein the second VM is linked to an identification (ID) of the second client; and program code to dynamically schedule serial completion of services for respective clients by triggering an instantiation of the first VM to complete the first one or more services during a first time period and an instantiation of the second VM to complete the second one or more services during a second time period that is different from the first time period, wherein the first time period does not overlap with the second time period and the shared hardware and software resources are utilized for completing client services by only one VM at a time.

12. The computer program product of claim 11, wherein said program code stored on the computable readable storage device further comprises:

program code to identify first service tasks required to complete the first one or more services of the first client and to identify second service tasks required to complete the second one or more services of the second client, wherein the first service tasks are linked to the first VM within a services database, and wherein the second service tasks are linked to the second VM within the services database;

program code to, in response to the instantiation of the first VM, forward the first service tasks to the first VM for execution of the first service tasks on the first VM; and program code to, in response to the instantiation of the second VM, forward the second service tasks to the second VM for execution on the second VM.

13. The computer program product of claim 12, wherein said program code to dynamically schedule comprises:

program code to receive a signal indicating completion of one of the first service tasks on the first VM or one of the second service tasks on the second VM; and program code to, in response to receipt of the signal:

de-instantiate a corresponding one of the first VM and the second VM;

evaluate scheduling criteria for completing a next service waiting to be completed; and in response to arrival of a time for completing the next service, trigger an instantiation of a next VM on the single data processing system to complete the next service.

14. The computer program product of claim 13, said program code stored on the computable readable storage device further comprising:

program code to record one or more characteristics of the first one or more services and the second one or more services within the services database;

program code to track actual completion characteristics of the first one or more services and the second one or more services;

program code to update the services database with the actual completion characteristics to generate a historical record;

program code to dynamically modify a schedule for completing at least one of the first one or more services, the second one or more services, and the next service based on the historical record of actual completion characteristics.

15. The computer program product of claim 14, wherein said program code stored on the computable readable storage device further comprises:

program code to monitor a start time and an end time of execution of the first service tasks and the second service tasks on the respective first VM and second VM;

program code to, in response to an actual end time for executing at least one of the first service tasks on the first VM or at least one of the second service tasks on the second VM being different from a pre-set end time scheduled for a corresponding at least one of the first one or more services or at least one of the second one or more services:

record the actual end time within the historical record;

determine an available time between the actual end time and a next scheduled time at which a following service is scheduled for completion;

compare the available time to one or more completion times required for a corresponding one or more un-constrained services that require scheduling for completion and which do not have specific time constraints; and in response to an un-constrained service having a completion time that is less than the available time, such that the un-constrained service can be completed during the available time on an assigned next VM, update a scheduling sequence to serially instantiate the next VM to complete the un-constrained service sequentially after the actual end time recorded.

16. The computer program product of claim 11, said program code stored on the computable readable storage device further comprising code for:

program code to evaluate each of a plurality of available times, representing (a) times during which no service with a pre-set start time is scheduled for completion and (b) available time based on a historical time of completion of a time-scheduled service that completes before a pre-set end time;

program code to compare the available times against a required completion time for an un-constrained service with flexible scheduling requirements;

program code to, in response to there being only one available time to complete the un-constrained service, schedule the un-constrained service for completion by an associated VM at the one available time; and program code to, in response to there being more than one available times exist during which the un-constrained service may be completed:

dynamically select a best available time from among the available times to complete the un-constrained service; and schedule the un-constrained service for completion by a next VM assigned to that un-constrained service during the best available time selected;

wherein the best available time is determined by evaluating one or more factors, including an evaluation of: a relative priority of the un-constrained service relative to each other un-constrained service; specific services tasks executed by other services serially completed with the un-constrained service; preferred time for completing the un-constrained service; and maintenance schedules for specific resources required by the next VM to complete the un-constrained service.

17. The computer program product of claim 11, said program code stored on the computable readable storage device further comprising:

program code to receive a first input with first parameters identifying the first one or more services and the first client and a second input with second parameters identifying the second one or more services and the second client;

program code to generate a services database entry within a services database for each of the first parameters and the second parameters; and program code to, in response to at least one of the first parameters and the second parameters including scheduling related information, update a scheduling order for completing the first one or more services and the second one or more services based on the scheduling information;

wherein said program code to generate includes program code to, in response to at least one of the first parameters and the second parameters including the scheduling related information, link the scheduling related information to respective, corresponding first or second services within the services database entry.

18. The computer program product of claim 17, said program code stored on the computable readable storage device further comprising:

program code to identify one or more services tasks required for completing the first one or more services and the second one or more services;

program code to incorporate the one or more services tasks into respective database entries corresponding to the first one or more services and the second one or more services;

program code to subsequently forward the one or more services tasks for completion on the corresponding first VM or second VM based on the scheduling order within the services database, wherein the first VM and the second VM are serially instantiated without any overlap in resources usage among the first VM and the second VM during completion of respective first service tasks required for completing the first one or more services and second service tasks required for completing the second one or more services;

program code to record a length of time for completion of services on each assigned VM;

program code to, in response to the scheduling related information of a service including pre-set scheduling time information, detect an actual completion time for the service;

program code to update the services database with the actual completion time;

program code to assign, based on input parameters, a relative priority value to at least one service scheduled for completion; and program code to selectively schedule completion of the at least one service via instantiation of a corresponding VM relative to a completion of other services based on (a) preset times required for completing particular services, (b) a historical length of time for completing services on each VM, and (c) the relative priority value of the at least one service compared to priority values of other services.

19. The computer program product of claim 11, said program code stored on the computable readable storage device further comprising:

program code to receive input parameters to configure an idle VM to support identified services for a new client;

program code to evaluate one or more scheduling parameters within the input parameters and to compare the one or more scheduling parameters against currently available times for scheduling completion of the identified services for the new client, wherein the scheduling parameters include one or more of a preset start time, a preset end time, a length of contiguous time required for completing the service, and an assigned priority;
program code to, in response to there being available time to schedule the completion of the identified services for the new client without any conflicts in resource usage with existing, previously scheduled services:
configure the idle VM as a new client VM to support the new client;
schedule the identified services of the new client for completion via the new client VM based on a plurality of factors, the plurality of factors including the preset start time, available times, and the assigned priority; and
update one or more tables within a services database to record information about the new client, new client VM, services of the new client, and scheduling information for the identified services; and
program code to, in response to there being no available time to schedule the identified service or in response to detecting a conflict in a scheduling information received for the new client, generate and issue a signal to trigger a re-scheduling of the one or more of the identified services for the new client.

20. A data processing system comprising:
a plurality of shared hardware and software resources including one or more processors, one or more memories, and one or more services applications;
a virtualization module that includes firmware, which configures the data processing system as multiple individual virtual machines (VMs) that share the plurality of shared hardware and software resources;
a virtual machine manager (VMM) executing on a processor and which triggers the virtualization module to serially instantiate the individual VMs to complete a specific one or more services assigned to the individual VMs, said VMM comprising functional modules, which modules when executed on the processor enable discrete provisioning of the shared hardware and software resources of the data processing system to complete services for multiple different clients via uniquely assigned virtual machines (VMs) configured on the data processing system, while maintaining security and privacy for each client, wherein said VMM implements a plurality of functions that enable the system to:
assign and configure each of the individual virtual machine (VMs) to operate as a client-specific VM and complete client services of a single client, wherein each assigned client-specific VM is linked to an identification (ID) of an assigned client;
schedule a time and serial order for completing client services via an assigned client-specific VM;
trigger an instantiation of the client-specific VM at a scheduled time;
forward one or more service tasks for execution on the client-specific VM, said one or more service tasks being tasks that are required for completing client services on the client VM;
monitor and record historical information about actual completion time of client services on each client-specific VM; and
dynamically update a scheduling order for completion of scheduled client services and for corresponding serial instantiation of multiple client-specific VMs assigned to the scheduled client services, wherein dynamically updating the scheduling order is based on a plurality of factors including (i) pre-set time scheduling information for one or more of the scheduled client services, (ii) priority assigned to one or more of the scheduled client services; and (iii) historical data related to actual completion times of client services by various VMs of the client-specific VMs.

21. A data processing system having one or more processors, a plurality of shared hardware and software resources, a virtualization module that enables creation of multiple virtual machines (VMs) on the data processing system utilizing the shared hardware and software resources, wherein the data processing system is configured to perform a series of functions to enable discrete provisioning of the shared hardware and software resources of the data processing system to complete services for multiple different clients via uniquely assigned VMs on the data processing system, while maintaining security and privacy for each client, wherein said data processing system is configured to:
assign a first one or more services corresponding to a first client to a first virtual machine (VM) from among the multiple VMs configured on the data processing system;
assign a second one or more services corresponding to a second client to a second VM from among the multiple VMs configured on the data processing system;
configure the first VM to provide service to only the first client and configure the second VM to provide service to only the second client, wherein the first VM is linked to an identification (ID) of the first client, and wherein the second VM is linked to an identification (ID) of the second client; and
dynamically schedule serial completion of services for respective clients by triggering an first instantiation of the first VM to complete the first one or more services during a first time period and an instantiation of the second VM to complete the second one or more services during a second time period that is different from the first time period, wherein the first time period does not overlap with the second time period and the shared hardware and software resources are utilized for completing client services by only one VM at a time, said dynamically scheduling comprising configuring the data processing system to:
identify first service tasks required to complete the first one or more services of the first client and second service tasks required to complete the second one or more services of the second client;
in response to the instantiation of the first VM, forward the first service tasks to the first VM for execution of the first service tasks on the first VM; and
in response to the instantiation of the second VM, forward the second service tasks to the second VM for execution thereon.

22. The data processing system of claim 21, wherein the data processing system is further configured to:
record one or more characteristics of the first one or more services and the second one or more services within a services database;
track actual completion characteristics of the first one or more services and the second one or more services;
receive a signal indicating completion of one of the first service tasks on the first VM or one of the second service tasks on the second VM;
responsive to receipt of the signal:
de-Instantiate a corresponding one of the first VM and the second VM;
evaluate scheduling criteria for completing a next service waiting to be completed; and update the services database with the actual completion characteristics to generate a historical record;

dynamically modify a schedule for completing at least one of the first one or more services, the second one or more services, and the next service based on the historical record of actual completion characteristics; and in response to arrival of a time for completing the next service, trigger an instantiation of a next VM on the data processing system to complete the next service.

23. The data processing system of claim 21, wherein the data processing system is further configured to:

monitor a start time and an end time of execution of the first service tasks and the second service tasks on the respective first VM and second VM;

in response to an actual end time for executing at least one of the first service tasks on the first VM or at least one of the second service tasks on the second VM is being different from a pre-set end time scheduled for a corresponding at least one of the first one or more services or at least one of the second one or more services:

record the actual end time within the historical record;

determine an available time between the actual end time and a next scheduled time at which a following service is scheduled for completion;

compare the available time to one or more completion times required for a corresponding one or more un-constrained services that require scheduling for completion and which do not have specific time constraints; and in response to identifying an un-constrained service having a completion time that is less than the available time, such that the identified un-constrained service can be completed during the available time on an assigned next VM, update a scheduling sequence to serially instantiate the next VM to complete the identified un-constrained service sequentially after the actual end time recorded;

evaluate each of a plurality of available times, representing (a) times during which no service with a pre-set start time is scheduled for completion and (b) available time based on a historical time of completion of a time-scheduled service that completes before the pre-set end time;

compare the available times against a required completion time for a flexible un-constrained service with flexible scheduling requirements;

in response to there being only one available time to complete the flexible un-constrained service, schedule the flexible un-constrained service for completion by an associated VM at the one available time; and in response to there being more than one available times during which the un-constrained service may be completed:

dynamically select a best available time from among the available times to complete the flexible un-constrained service; and schedule the flexible un-constrained service for completion by a next VM assigned to that flexible un-constrained service during the best available time selected; and wherein the best available time is determined by evaluating one or more factors, including an evaluation of: a relative priority of the flexible un-constrained service relative to each other un-constrained service; specific services tasks executed by other services serially completed with the flexible un-constrained service; preferred time for completing the flexible un-constrained service; and maintenance schedules for specific resources required by the next VM to complete the flexible un-constrained service.

24. The data processing system of claim 21, wherein the data processing system is further configured to:

receive a first input with first parameters identifying the first one or more services and the first client and a second input with second parameters identifying the second one or more services and the second client;

generate a services database entry within a services database for each of the first parameters and the second parameters;

in response to at least one of the first parameters and the second parameters including scheduling related information, update a scheduling order for completing the first one or more services and the second one or more services based on the scheduling related information wherein generating the services database entry within the services database for each of the first parameters and the second parameters includes, in response to at least one of the first parameters and the second parameters including the scheduling related information linking the scheduling related information to respective, corresponding first or second services within the services database entry;

identify one or more services tasks required for completing the first one or more services and the second one or more services;

incorporate the one or more services tasks into respective database entries corresponding to the first one or more services and the second one or more services;

subsequently forward the one or more services tasks for completion on the corresponding first VM or second VM based on the scheduling order within the services database, wherein the first VM and the second VM are serially instantiated without any overlap in resources usage among the first VM and the second VM during completion of respective first service tasks required for completing the first one or more services and second service tasks required for completing the second one or more services;

record a length of time for completion of services on each assigned VM;

in response to the scheduling related information of a service including pre-set scheduling time information, detect an actual completion time for the service;

update the services database with the actual completion time;

assign, based on input parameters, a relative priority value to at least one service scheduled for completion; and selectively schedule completion of the at least one service via instantiation of a corresponding VM relative to a completion of other services based on (a) preset times required for completing particular services, (b) a historical length of time for completing services on each VM, and (c) the relative priority value of the at least one service compared to priority values of other services.

25. The data processing system of claim 21, wherein the data processing system is further configured to:

receive input parameters to configure an idle VM to support identified services for a new client;

evaluate one or more scheduling parameters within the input parameters and compare the one or more scheduling parameters against currently available times for scheduling completion of the identified services for the new client, wherein the scheduling parameters include one or more of a preset start time, a preset end time, a length of contiguous time required for completing the service, and an assigned priority;

in response to there being available time to schedule the completion of the identified services for the new client without any conflicts in resource usage with existing, previously scheduled services:
configure the idle VM as a new client VM to support the new client;
schedule the identified services of the new client for completion via the new client VM based on a plurality of factors, the plurality of factors including the preset start time, available times, and the assigned priority; and
update one or more tables within a services database to record information about the new client, new client VM, services of the new client, and scheduling information for the identified services; and
in response to there being no available time to schedule the identified services or detecting a conflict in a scheduling information received for the new client, generate and issue a signal to trigger re-scheduling of one or more of the identified services for the new client.

26. The method of claim 1, further comprising:
the processor evaluating each of a plurality of available times, representing (a) times during which no service with a pre-set start time is scheduled for completion and (b) available time based on a historical time of completion of a time-scheduled service that completes before a pre-set end time;
the processor comparing the available times against a required completion time for an un-constrained service with flexible scheduling requirements; and
the processor, in response to there being more than one available time during which the un-constrained service may be completed:
the processor dynamically selecting a best available time from among the available times to complete the un-constrained service; and
the processor scheduling the un-constrained service for completion by a next VM assigned to that un-constrained service during the best available time selected;
wherein the best available time is determined by evaluating one or more factors, including an evaluation of: a relative priority of the un-constrained service relative to each other un-constrained service; specific services tasks executed by other services serially completed with the un-constrained service; preferred time for completing the un-constrained service; and maintenance schedules for specific resources required by the next VM to complete the un-constrained service.

27. The method of claim 1, further comprising:
the processor receiving input parameters to configure an idle VM to support identified services for a new client;
the processor evaluating one or more scheduling parameters within the input parameters and comparing the one or more scheduling parameters against currently available times for scheduling completion of the identified services for the new client, wherein the scheduling parameters include one or more of a preset start time, a preset end time, a length of contiguous time required for completing the service, and an assigned priority; and
the processor, in response to there being no available time to schedule the identified services or the processor detecting a conflict in a scheduling information received for the new client, the processor generating and issuing a signal to trigger a re-scheduling of one or more of the identified services for the new client.

* * * * *